United States Patent [19]

Rabenseifner

[11] 4,030,777

[45] June 21, 1977

[54] VEHICLE SUSPENSION SYSTEM

[75] Inventor: Karl Rabenseifner, Pappenheim, Germany

[73] Assignee: Volkswagenwerk Aktiengesellschaft, Wolfsburg, Germany

[22] Filed: Nov. 10, 1975

[21] Appl. No.: 630,718

Related U.S. Application Data

[63] Continuation of Ser. No. 502,824, Sept. 3, 1974, abandoned.

[30] Foreign Application Priority Data

Sept. 22, 1973 Germany .......................... 2347793
Dec. 20, 1973 Germany .......................... 2363443

[52] U.S. Cl. ............................. 280/714; 267/65 D
[51] Int. Cl.² .......................................... B60G 11/26
[58] Field of Search .................. 280/702, 708, 714; 267/64 R, 64 A, 65 R, 65 D, 113

[56] References Cited

UNITED STATES PATENTS 3,550,993  12/1970  Peiffer .............................. 280/708
3,558,153  1/1971   Strauff ............................. 280/708

Primary Examiner—Joseph F. Peters, Jr.
Assistant Examiner—John A. Carroll

Attorney, Agent, or Firm—Brumbaugh, Graves, Donohue & Raymond

[57] ABSTRACT

A fluid suspension system tends to maintain a vehicle having at least two axles and a plurality of wheels in a level plane. The suspension system comprises a source of fluid under pressure and a plurality of fluid suspension devices coupled both to the vehicle frame and to the wheels of the vehicle. Different fluid suspension devices are coupled to different wheels and each device includes a cylinder and a piston. The piston of each suspension device is reciprocable in the associated cylinder and defines, together with the cylinder wall, a pressure chamber in the cylinder. A common supply line is coupled to the source of fluid under pressure for conducting fluid toward the suspension devices, while a common return line, also coupled to the source of fluid under pressure, conducts fluid away from the suspension devices. A system of conduits is coupled to the suspension devices, the common supply line and the common return line so as to define an integrated system of fluid flow paths. In each suspension device the movement of the piston in response to different loadings of the associated wheel of the vehicle controls the flow of pressurized fluid to and from the device so as to maintain the piston within a predetermined range of positions relative to the cylinder.

21 Claims, 2 Drawing Figures

Fig.1

VEHICLE SUSPENSION SYSTEM

This is a continuation of application Ser. No. 502,824 filed Sept. 3, 1974, now abandoned.

BACKGROUND OF THE INVENTION

Typically, in a vehicle such as an automobile, the frame and body of the vehicle are resiliently mounted on the axles and wheels for the vehicle so as to distribute the weight of the vehicle properly to its wheels when the vehicle is at a standstill. While such a suspension system is adequate for a stationary attitude of the vehicle, for a slow acceleration of the vehicle, and for straight line travel over a level roadway, quick accelerations and travel over uneven road surfaces at high speeds and around curves cause the body of a vehicle to move relative to the supporting axles and wheels and, in many cases, to affect adversely the driver's control of the vehicle. The tendency for a vehicle to "roll" when entering a curve is one example of a situation in which conventional metal suspension springs for a vehicle are not adequate to ensure full control of the vehicle. Even in situations where control of the vehicle is not significantly affected, the comfort of passengers riding in the vehicle is diminished by movements of the vehicle body away from a level plane.

In order to overcome the disadvantages of the conventional metal spring suspension system for vehicles, MacDuff U.S. Pat. No. 3,002,765 and German Pat. No. 1,255,515 both propose an automatic leveling vehicle suspension system in which each wheel of a vehicle, such as an automobile, is provided with a hydraulic suspension device coupling the wheel to the frame of the vehicle. Each suspension device includes a cylinder that is connected to the frame of the vehicle and a piston that is connected to one wheel of the vehicle. Thus, the vertical distance between each wheel and the vehicle frame is reflected in a corresponding position of the piston of the associated suspension device relative to the cylinder of the device. The relative position of each piston is determined by the load on the associated wheel and the pressure of the hydraulic fluid in each cylinder. The hydraulic pressure in the suspension devices for the front two wheels of the vehicle is controlled by a pair of interrelated valves, while a single valve controls the hydraulic pressure in the suspension devices for the rear two wheels of the vehicle. The valves for the front wheels operate in response to the relative position of a pendulum mass suspended intermediate the wheels. The valve for the rear wheels operates in response to the relative position of a torsion anti-roll bar interconnecting the ends of the rear axle of the vehicle.

In operation, when a vehicle equipped with the suspension system described and illustrated in the patents goes into a sharp curve, for example, the centrifugal forces acting on the vehicle cause the body of the vehicle to roll to the outside of the curve. Since the pendulum mass for the front wheels of the vehicle is also swung to the outside of the curve, additional hydraulic fluid is forced into the suspension device for the "outside" front wheel so as to raise the frame and the body relative to the "outside" wheel and to restore the body to a relatively level position.

The patented suspension system provided a three-point (i.e. the two front wheels and the rear axle) automatic leveling system for a vehicle. Since three points are just sufficient to define a plane, the patented suspension system is merely concerned with coordinating the vertical positions of the portion of the vehicle frame above the three points (i.e. coordinating the action of the suspension devices) so as to maintain the plane that is automatically defined thereby relatively level. If, however, it is desired to provide a four-point leveling system, in which, for example, suspension devices for the rear wheels of a vehicle are not controlled by a single valve so as to function identically, a further problem must be overcome. Specifically, in such a four-point suspension system, not only must a relatively level plane be defined, but each hydraulic suspension device must also be automatically adjusted relative to the other three devices to coordinate the action of the four devices and to maintain the four points represented by the suspension devices in a single plane.

SUMMARY OF THE INVENTION

The present invention is directed to a vehicle suspension system which utilizes different fluid suspension devices for different wheels of the vehicle and which can provide coordinated level control of a vehicle without regard to the number of axles and wheels of the vehicle. A suspension system, according to the invention, is used in a vehicle having a frame, a plurality of wheels and at least two axles mounting the wheels. The system comprises a source of fluid under pressure and a plurality of fluid suspension devices coupled to the vehicle frame and to wheels of the vehicle. Different fluid suspension devices are coupled to different wheels and each device includes a cylinder and a piston mounted for reciprocating movement in the cylinder. The cylinder and the face of the piston define a pressure chamber in the cylinder.

A common supply line coupled to the source of pressurized fluid conducts fluid under pressure toward each of the fluid suspension devices, while a common return line, also coupled to the source of pressurized fluid, conducts fluid away from the suspension devices. A residual fluid pressure is maintained in the common return line. A system of conduits is coupled to the fluid suspension devices, the common supply line, and the common return line so as to define an integrated system of fluid flow paths. The conduit system includes, for each fluid suspension device, a pressure line that communicates with the pressure chamber in an associated suspension device and delivers fluid under pressure from the common supply line to the pressure chamber. A control line is provided for at least one of the suspension devices to conduct fluid away from the device toward the common return line. The control line communicates with the pressure chamber of the associated suspension device intermittently, depending upon the relative position of the piston in the cylinder of the suspension device. The control line only communicates with the pressure chamber when the piston is in a position relative to the cylinder corresponding to a vertical position of an associated wheel of the vehicle relative to the vehicle frame lower than a predetermined level.

In operation, the source of fluid under pressure provides fluid at a pressure within a predetermined range to each of the suspension devices so as to maintain the pistons of the respective suspension devices in essentially identical positions relative to their associated cylinders under even loading and normal operation of the vehicle. If, however, a wheel of the vehicle should move vertically away from the frame of the vehicle, due to uneven loading of the vehicle, for example, so that the vehicle is no longer level, there will be a corresponding movement of the piston in the cylinder of the associated suspension device. Assuming that the suspension device is equipped with both a pressure line and a control line, the movment of the piston will open communication between the control line and the pressure chamber of the suspension device. Pressurized fluid will bleed off from the chamber to permit the piston to move back to a normal position in the cylinder so that the wheel moves back toward the vehicle frame and the vehicle tends to level off. The residual pressure in the common return line, with which the control line communicates, ensures that not all of the pressure is relieved in the pressure chamber through the control line but rather that a predetermined minimum pressure is maintained in the pressure chamber. The residual pressure in the return line equals the predetermined minimum fluid pressure in the pressure chamber, neglecting flow losses.

As can be seen from the above description, in certain situations, one or more of the suspension devices might have pressurized fluid being delivered to its pressure chamber through an associated pressure line, while, at the same time, pressurized fluid is being conducted away from the pressure chamber through an associated control line. Such a situation would require a fluid pump at the source of fluid under pressure of exceptionally large size. Therefore, a preferred embodiment of the invention utilizes a control valve that interrupts the flow of pressurized fluid to the pressure line for a suspension device when the control line for the device is communicating with the pressure chamber of the suspension device. Similarly, when the control line has bled off sufficient pressurized fluid to permit the piston of the fluid suspension device to return to a position in the cylinder within a predetermined range of positions, the control valve interrupts communication between the control line and the common return line and reopens communication between the pressure line and the common supply line. Such a control valve thus affords individualized control of the suspension device for each wheel of the vehicle that has an associated fluid suspension device coupled to both a pressure line and a control line and permits coordinated control of all such fluid suspension devices.

At any given time, the position of a specific wheel relative to the vehicle frame depends largely on the location of the center of gravity of the vehicle, and hence on the loading condition of the vehicle. One advantage of the invention, therefore, is that the suspension system permits automatic adjustment or leveling of the vehicle in different loading situations. In general, the individualized control of the fluid suspension devices afforded by the control valves ensures that three wheels will determine a level plane for the vehicle, in conformity with the roadway and loading conditions. At the same time the remaining wheels of the vehicle are adjusted to bear on the roadway with a force related to the residual pressure in the common return line. Thus, the inventive suspension system may be used not only in vehicles with four wheels and two axles, but also in vehicles having any number of wheels and axles.

A control valve, into which the pressure and control lines for a particular fluid suspension device open, preferably includes a housing and a slide member located within the housing for reciprocal movement. The slide member has a passage extending longitudinally of the member and communicating with each end of the member. A recess is formed adjacent to and communicating with one end of the slide member so as to communicate with the control line where the control line opens into the interior of the valve housing. The return line communicates with the interior of the valve housing adjacent the other end of the slide member. A continuous passageway between the control line and the return line can therefore be defined by the recess and the longitudinal passage in the slide member. Spaced lengthwise of the slide member from the recess for the control line is a second recess that can be aligned with the point at which the pressure line communicates with the interior of the valve housing to provide a passageway through the valve to the common supply line.

A spring normally biases the slide member into a position in which the end of the slide member having the recess for the control line contacts an end of the valve housing and closes the corresponding end of the longitudinal passage. Thus, communication between the control line and the common return line is interrupted. The pressure of the fluid in the control line, however, acts on a surface of the associated recess so as to oppose the biasing action of the spring. In situations where the fluid pressure overcomes the biasing action of the spring, the slide member is biased into a second position in which the end of the longitudinal passage is spaced from the end of the valve housing. The space between the end of the longitudinal passage and the end of the valve housing opens communication between the control line and the return line through the associated recess in the slide member and the longitudinal passage. At the same time, the movement of the slide member into its second position disrupts the alignment of the second recess with the pressure line and thus interrupts communication between the pressure line and the common supply line for the pressurized fluid.

The control valve described above avoids the use of a plurality of valves for regulating the interdependence of the various fluid suspension devices. Control valves for different suspension devices that are equipped with both pressure lines and control lines and that are associated with the wheels of any one axle may, however, be collected into a single structural unit for convenience of construction, assembly and maintenance.

In order to maintain the pressure in the common supply line within a specified range of pressures, the supply line preferably communicates with the fluid pump through a pressure regulating valve. The regulating valve includes a housing defining a valve seat and a valve body mounted for reciprocating movement in the housing. The common supply line communicates with the interior of the valve housing as does a conduit extending from the pump to the regulating valve. The valve body and the housing are configured so that when the valve body is seated in the valve seat under the action of a biasing spring, a surface of a given cross-sectional area is exposed to the pressure of fluid in the supply line. The pressure of the fluid in the supply line opposes the biasing action of the spring and tends to push the valve body away from the valve seat. If the pressure of the fluid in the supply line is sufficient to overcome the biasing action of the spring, the valve body moves away from the valve seat and communication between the supply line and the pump is interrupted. Thus, the regulating valve establishes a connection between the pump and the common supply line for as long as the pressure in the supply line does not exceed a predetermined maximum value. When communication between the common supply line and the pump is interrupted, the fluid being pumped by the pump flows through a return line to a fluid reservoir and does not flow throughout the suspension system.

When the valve body is forced away from the valve seat, a second surface of the valve body is exposed to the pressure of the fluid in the supply line, in addition to the first surface of the valve body. Due to the increased surface area that is exposed to the fluid pressure in the supply line, the valve body remains spaced from the valve seat until the pressure in the common supply line has dropped below a predetermined minimum value. The spring in the regulating valve can then overcome the pressure exerted by the fluid in the common supply line and seat the valve body of the valve seat. The ratio of the area of the first surface of the valve body to the combined areas of the first and second surfaces of the valve body defines the radio of maximum pressure in the supply line to the minimum pressure in the line.

The various parts of the invention may be equipped with high pressure seals to prevent oil leakage, but if the system is to be controlled with a comparatively small hysteresis loop, it is preferable to provide low pressure seals for the various components. Leakage lines are also provided to extend from the seals to the reservoir to return seepage to the reservoir. Such leakage lines may be employed for connecting other apparatus, such as hydraulic riding comfort systems (e.g. power windows) and power steering systems.

To enhance the operation of the individual fluid suspension devices, the pressure lines for the devices can communicate with the pressure chambers of the devices through check valves so that pressurized fluid can only enter the pressure chambers through the pressure lines and, consequently, must exit from the pressure chambers through the control lines. The fluid suspension devices may also incorporate hydro-pneumatic spring elements that act as shock absorbers. Such a spring element includes a two-part reservoir divided by a flexible diaphragm. One part of the reservoir is filled with pressurized gas, the other with pressurized fluid. The second reservoir part communicates with the pressure chamber of the associated suspension device.

In one embodiment of the basic suspension system, which is especially efficient in utilizing the pressure of the pressurized fluid, only two longitudinally spaced apart wheels on one side of the vehicle are coupled to fluid suspension devices that have both a pressure line and a control line. The pressure line associated with the suspension device for the more forward wheel is coupled to the common supply line, while the pressure line associated with the suspension device for the more rearward wheel is connected to the control line of the forward suspension device. Only the control line of the rear suspension device is coupled to the common return line. A residual pressure is maintained in the common result line, so that even under extreme roadway conditions, total pressure relief of the systems is avoided.

The series-type arrangement of the fluid suspension devices permits multistage utilization of the pressurized fluid and affords an espectially high efficiency in the suspension system. Preferably both side of the vehicle are constructed with suspension devices arranged in series so that the control lines associated with the more forward wheels can be joined together to form a single supply line for the suspension devices of the more rearward wheels. As in the basis embodiment of the invention, the residual pressure in the common return line can be advantageously utilized for other appliances, such as hydraulic riding comfort systems (e.g. power windows, hydraulic operation of convertible tops, etc.). Since, it the particular embodiment of the invention described immediately above, only two wheels on each side of a vehicle are coupled to fluid suspension devices that have both control lines and pressure lines and since, of the suspension devices coupled to the forward and rearward wheels, only one each of the forward and of the rearward suspension devices determine the level of the vehicle at a given time, a "level line" is established according to the position of the center of gravity, the loading of the vehicle and the road conditions, independently of the number of axles of the vehicle.

In an embodiment of the invention in which suspension devices that have pressure lines and control lines are provided on only one side of the vehicle, the suspension devices on the other side of the vehicles are each coupled to only a single fluid line, which serves both as a pressure line and a control line. Thus, the "level line" is always defined by the suspension devices on one side of the vehicle and the "level line" always lies on that one side of the vehicle.

A most efficient operation of a suspension system having a series type arrangement of suspension devices is achieved if the pressure lines for the rearward fluid suspension devices and of any additional suspension devices (i.e., fluid suspension devices having no separate control line) communicate with the control lines for the forward suspension devices through a check valve. When utilized in conjunction with a pressure regulating valve to maintain a residual pressure in the common return line, the suspension devices for the rearward wheels thus form part of a generally closed system of fluid flow paths within the overall fluid suspension system. Similarly, the pressure lines for the fluid suspension devices for the forward wheels may also be coupled to the common supply line by way of a check valve.

In order to moderate the spring action of the vehicle wheels relative to the spring action of the associated vehicle axles, each of the pressure lines for the forward fluid suspension devices may communicate with a forward pressure reservoir, while each of the pressure lines for the rearward fluid suspension devices may communicate with a rearward pressure reservoir. Each of the reservoirs may be a hydro-pneumatic spring pressure element which comprises a chamber divided by a bladder into a part containing hydraulic fluid and another part confining a quantity of compressed gas under pressure. The check valves previously mentioned are located upstream of the pressure reservoirs. Such a common pressure reservoir eliminates the necesssity of similar individual reservoirs for the individual fluid suspension devices. The advantageous result of such an arrangement will, however, be counteracted to some extent by the stabilizer required to interconnect the wheels of each axle.

As can be seen from the above description, the present invention requires no additional control system for the overall control of the distribution of forces and the maintenance of a level plane for the vehicle. Rather, the desired result is achieved simply by controlling the flow of fluid under pressure through the suspension system. The invention also facilitates the production of individual bracking forces for each of the wheels of the vehicle. This may be done using the fluid pressure in the various suspension devices so that braking forces corresponding to the respective wheel loads can be created relying on control signals from the fluid suspension devices.

BRIEF DESCRIPTION OF THE DRAWINGS

For a better understanding of the invention, reference may be made in the following descriptions of two exemplary embodiments, taken in conjunction with the figures of the accompanying drawings, in which.

DESCRIPTION OF THE EMBODIMENTS

Figure 1:
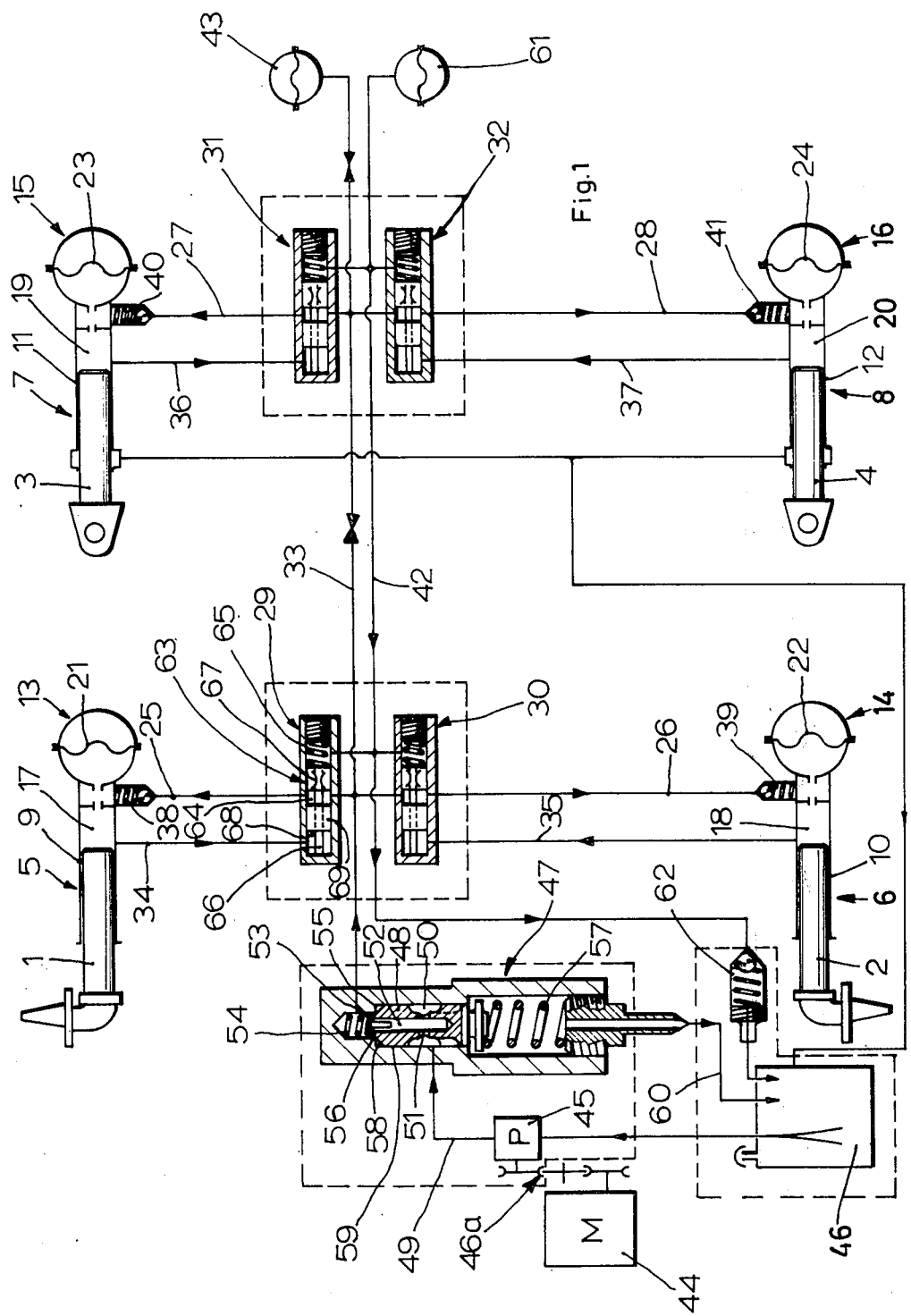
FIG. 1 is a schematic view of a suspension system according to the invention for a passenger automobile having four wheels and two axles.

FIG. 1 of the drawings illustrates an automobile having two axles and four wheels (not shown). Associated with each wheel of the automobile is different one of four hydraulic suspension devices 5-8. The suspension devices 5-8 include cylinders 9-12, respectively, each of which is attached to the frame of the automobile. Pistons 1-4 reciprocate in corresponding cylinders 9-12, respectively, and are coupled at their lower or, as viewed in FIG. 1, left-hand ends to the wheels of the automobile. The faces of the pistons 1-4 define, in part, within the cylinders 9-12 pressure chambers 17-20, respectively. The cylinders 9-12 are topped by fluid pressure reservoirs or chambers 13-16, each of which is divided into two parts in a generally horizontal plane by a flexible diaphragm 21-24. Above the diaphragms 21-24 are quantities of compressed gas, while below the diaphragms, the reservoirs 13-16 communicate with their associated pressure chamber 17-20 and are filled with hydraulic fluid. Openings between the reservoirs 13-16 and the presure chambers 17-20 are relatively small in cross-sectional flow area. The fluid pressure reservoirs 13-16 act as shock absorbers for their associated wheels.

Pressure lines 25-28 communicate with the pressure chambers 17-20 to deliver hydraulic fluid under pressure to the pressure chambers. The pressure lines 25-28 communicate with the interiors of their associated cylinders 9-12 at points that are above the maximum upward (i.e. to the right in FIG. 1) limit of travel of the respective pistons 1-4. As shown in the illustrated embodiment, the lines 25-28 enter the cylinders 9-12 and the pressure chambers 17-20 immediately below the chambers 13-16. Immediately before entering the pressure chambers 17-20, the pressure lines 25-28 are coupled to one-way check valves 38-41, respectively, which permit the flow of fluid under pressure only toward and not away from the pressure chambers. Upstream of the check valves 38-41, the pressure lines 25-28 communicate with control valves 29-32. One control valve 29-32 is provided for each wheel and associated hydraulic suspension device 5-8. Immediately upstream of the control valves 29-32, short connecting lines couple the control valves to a common supply line 33 which conducts fluid under pressure from an appropriate source, as will be described hereinafter, to the respective hydraulic suspension devices 5-8. Thus, with the control valves 29-32 normally open, the pressure lines 25-28 and ultimately the pressure chambers 17-20 all communicate with the common supply line 33.

Other lines, which will be referred to herein as control lines, 34-37 extend between the hydraulic suspension devices 5-8 and the control valves 29-32. The control lines 34-37 communicate with the interiors of the cylinders 9-12, and hence the pressure chambers 17-20, to carry hydraulic fluid from the pressure chambers back toward the source of pressurized fluid. Since the points at which the control lines 34-37 communicate with the pressure chambers 17-20 can be covered and the control lines effectively closed off by upward movement of the pistons 1-4, the control lines 34-37 define levels in their respective cylinders 9-12 above which the faces of the pistons 1-4 will tend to return. Specifically, when the pressure of the fluid delivered by the pressure lines 25-28 builds up in the pressure chambers 17-20 so that the pistons 1-4 are forced below the levels of the ends of the control lines 34-37, the control lines 34-37 will bleed off fluid from the pressure chambers 17-20 and thereby reduce the pressure in the chambers. Consequently, the pistons 1-4 will tend to return to positions above the level of the ends of control lines 34-37 so as to close off the control lines. The limiting effect of the control lines 34-37 is facilitated by the operation of the control valves 29-32, as will be discussed hereinafter. Briefly, the control valves 29-32 permit, in the alternative, communication betwen the pressure lines 25-28 and the common supply line 33 or communication between the control lines 34-37 and a common return lines 42 that returns fluid under pressure to the fluid source.

The so-called source of pressurized hydraulic fluid includes a fluid reservoir 46, which is coupled by a conduit to a hydraulic pump 45. The pump 45 is driven by the engine 44 for the automobile through an appropriate transmission 46a. The pump 45 pumps the fluid through a conduit 49 into a pressure regulating valve 47, which, in turn, communicates with the common supply line 33. In order to maintain the required pressure in the supply line 33 when the engine 44 is shut off, the end of the supply line 33 away from the pump 45 communicates with a pressure reservoir 43. The reservoir 43 consists basically of a chamber, like the chambers 13-16, divided into two parts by a flexible bladder of diaphragm. The part of the chamber that communicates with the supply line 33 is filled with pressurized hydraulic fluid and the other part of the chamber is filled with compressed gas.

The pressure regulating valve 47, which maintains an adequate pressure in the supply line 33 when the engine 44 is running, does not maintain the pressure in the supply line 33 at or about a single pressure, but rather keeps the pressure within a specified range of pressures. The valve 47 includes an elongated tubular housing having a central bore which is step tapered twice along its length. The step taper that leads to the smallest diameter section of the central bore also defines, at the point of tapering, a valve seat 55 for a valve body 48. The largest diameter of the valve body 48 corresponds to the intermediate diameter of the step tapered central bore of the housing, in which the valve body 48 reciprocates.

The valve body 48 has a central bore 52 that communicates with one end of the valve body and is closed at its other end. Adjacent the closed end of the central bore 52, an annular groove 50 is formed around the circumference of the valve body 48 and the groove communicates with the central bore 52 through a radial passage 51. When the valve body 48 is seated on the valve seat 55, the annular groove 50 is aligned with the point at which the conduit 49 from the pump 45 enters the housing of the pressure regulating valve 47. Thus, hydraulic fluid under pressure flows through the conduit 49, the annular groove 50, the radial passage 51, and the central bore 52 in he valve body 48 and into the lower, smallest diameter end of the central bore in the valve housing. The smallest diameter section of the central bore of the valve housing, in turn, communicates with the common supply line 33 so that a flow of hydraulic fluid normally flows from the pump 45 into the supply line 33.

In order to ensure that pressurized fluid flows only in one direction into the common supply line 33 from the pressure regulating valve 47, a dish-shaped member 53 is fitted into the open end of the central bore 52 in the valve body 48 and is biased by a spring 54 so as to close the central bore 52. The flow of fluid from the pump 45 through the length of the central bore 52 in the valve body 48 opposes the pressure of the biasing spring 54, which is constructed so that it will permit a flow of fluid through the end of the central bore 52 and into the common supply line 33.

As can be seen from FIG. 1, when the valve body 48 is seated on the valve seat 55, only an end surface 56 of the valve body 48 having a relatively small surface area is exposed to the pressure of the hydraulic fluid in the common supply line 33. A large biasing spring 57 located in the largest diameter section of the central bore of the valve housing opposes the back pressure of the fluid in the common supply line 33 to maintain the valve body 48 seated on the valve seat 55. Thus, only a comparatively high pressure in the supply line 33 can unseat the valve body 48 from the valve seat 55. Nonetheless, as soon as the valve body 48 begins to move away from the valve seat 55, an additional annular, beveled surface 58 of the valve body 48 is exposed to the pressure of the fluid in the supply line 33. Since the fluid pressure is now acting on a larger composite surface area, the total force exerted on the valve body is considerably greater and, consequently, the valve body 48 can only be returned to seat in the valve seat 55 when the pressure in the supply line 33 is dropped to a value considerably below the pressure necessary to unseat the valve body. Thus, the pressure necessary to unseat the valve body 48 represents the maximum allowable pressure of the fluid in the supply line 33, while the pressure below which the pressure in the supply line 33 must drop in order to reseat the valve body 48 represents the minimum allowable pressure in the supply line 33.

The unseating of the valve body 48 interrupts the communication between the line 49 from the pump 45 and the interior of the valve housing, because the annular groove 50 no longer aligns with the point at which the line 49 communicates with the central bore of the housing. Rather, the end of the line 49 is blocked by an intermediate portion 59 of the valve body 48 and the annular groove 50 communicates with the largest diameter portion of the central bore of the housing for the valve 47. The fluid in the supply line 33 flows through the central bore 52 in the valve body 48, the radial passage 51, the annular groove 50 and into the largest diameter portion of the central bore of the valve housing. A nozzle screwed into the adjacent end of the central bore of the valve housing conducts the fluid out of the housing into a line 60 which returns the fluid to the fluid reservoir 46. Thus, when the valve body 48 is unseated from the valve seat 55, the valve 47 tends to relieve the pressure in the supply line 33.

Having now regulated the pressure of the fluid being delivered by the supply line 33 to the fluid suspension devices 5–8, the regulation of the pressure in the pressure chambers 17–20 will be described with reference to the operation of the control valves 29–32. Since each of the control valves 29–32 is identical in construction, the operation of the valves and their construction will be described in detail with regard only to control valve 29. The valve 29 includes a tubular housing that receives a generaly cylindrical valve body or slide 63. The slide 63 reciprocates in the housing of the valve 29 and is biased toward one end of the housing by a spring 65. The slide 63 is formed with a central, longitudinally extending bore 66 that communicates with both ends of the slide 63. At one end, the right-hand end as viewed as FIG. 1, the bore 66 includes a flow constriction 67. Two annular grooves or recesses are formed in the outer circumference of the slide 63, one adjacent the left-hand end of the slide 63, as shown in FIG. 1, and one closer to the opposite end of te slide 63. The two recesses are separated by a full diameter portion 69 of the slide 63.

As mentioned previously, the biasing spring 65 tends to press the slide 63 toward the left-hand end of the housing of the valve 29. When the slide 63 is in such a position, as illustrated in FIG. 1, the left-hand end of the slide is tightly pressed against the corresponding end of the housing of the valve 29 so that the left-hand end of the central bore 66 is closed. At the same time, the annular groove adjacent the left-hand end of the slide 63 is aligned with the point at which the control line 34 for the hydraulic suspension device 5 opens into the interior of the valve housing. The other annular groove 64 in the slide 63 is aligned with the point at which the supply line 25 for the suspension device 5 opens into the interior of the housing. Accordingly, fluid under pressure can flow from the common supply line 33 through the short connecting line into the interior of the housing for the valve 29. The fluid then flows around the annular groove 64 and into the pressure line 25, which delivers the fluid under pressure to the pressure chamber 17 of the suspension device 5. The control line 34, on the other hand, communicates with the interior of the housing for the valve 29 at the left-hand end of the housing, but does not communicate with the common return line 42 because the tight contact between the left-hand end of the slide 63 and the corresponding end wall of the housing closes off any egress of the fluid under pressure from the annular groove at the left-hand end of the slide 63.

In operation, the control valve 29 normally maintains the slide 63 in the position shown in FIG. 1. When, however, owing, for example, to unevenness in the roadway, the wheel that is coupled to the piston 1 assumes a vertical position below the vehicle frame which is below a predetermined level or position, the face of the piston 1 falls below the point at which the control line 34 communicates with the pressure chamber 17 of the suspension device 5. The control line 34 then provides escape for the pressurized fluid in the pressure chamber 17. With the full pressure of the fluid in the pressure chamber 17 acting through the control line 34 against an annular surface 68 of the left-hand groove in the slide 63, the pressure of the fluid in the control line 34 overcomes the biasing action of the spring 65. The fluid pressure thus forces the left-hand end of the slide 63 away from the end of the housing for the valve 29 so that fluid can flow from the control line 34, into the left-hand annular recess in the slide 63, and through the longitudinal central bore 66 in the slide 63 to the right-hand end of the housing for the valve 29. The common return line 42 communicates with the right-hand end of the housing for the valve 29 through a short connecting line, thereby providing a complete flow path for fluid under pressure to escape from the pressure chamber 17 and ultimately be returned to the fluid reservoir 46.

While the communication between the control line 34 and the common return line 42 is being opened by the action of the fluid pressure on the surface 68 of the slide 63, the annular groove 64 is being shifted out of alignment with the point at which the pressure line 25 communicates with the interior of the housing for the valve 29. Instead, the full diameter portion 69 of the slide 63 moves into alignment with the point at which the pressure line 35 enters the housing for the valve 29 and thereby effectively interrupts communicator between the common supply line 33 and the pressure line 25. Since the movement of the slide 63 prevents additional fluid under pressure from being delivered to the pressure chamber 17 and, at the same time, allows fluid to escape through the control line 34, the pressure in the chamber 17 is reduced and the piston 1 can return to a position in the cylinder 9 which is above the point at which the control line 34 enters the cylinder 9. When the piston 1 does move upward in the cylinder 9 to a point at which the piston closes off the communication between the control line 34 and the pressure chamber 17, the force of the fluid acting on the surface 68 of the slide 63 diminishes. When the biasing action of the spring 65 predominates over the pressure acting on the surface 68 of the slide 63, the slide 63 is biased by the spring 65 into a position in which the left-hand end of the passage 66 is again closed off. The annular passage 64 is then aligned with the point at which the pressure line 25 communicates with the housing for the valve 29 and fluid under pressure can again be delivered from the supply line 33 to the pressure chamber 17.

It will be understood that the operation of the control valve 29 will also have an effect on the hydrualic suspension devices 6-8 for the other wheels. For example, downward movement of the piston 1 out of the cyliner 9 will result in a corresponding change in the load on the wheel to which the piston 3 for the suspension device 7 is coupled. It is important to the present invention, however, that the wheels having presssure chambers which communicate with the common return line 42 at any particular moment also participate in carrying the total load of the automobile because of a residual pressure that is always maintained in the return line 42 and thus in the pressure chambers 17-20. The residual pressure in the return line 42 is maintained by providing an appropriate valve 62 between the common return line 42 and the fluid reservoir 46. The valve 62 can be set to maintain a desired residual pressure in the return line 42 by opening when the desired minimum or residual pressure is exceeded in the return line 42. To assist in the maintenance of the residual pressure, the end of the return line 42 away from the reservoir 46 is coupled to a pressure reservoir 61 similar to the pressure reservoir 43 to which the common supply line 33 is connected. The residual pressure maintained in the common return line 42 corresponds to a desired minimum pressure to be maintained in the pressure chambers 17-20, diminished by a flow pressure or flow loss. It is, of course, essential to the invention that the pressure of the fluid delivered to the respective cylinders 17-20 from the common supply line 33 always be at least as great as the desired minimum pressure for the chambers 17-20 or, in other words, at least as great as the residual pressure in the common return line 42 plus the flow losses to be expected to the various lines.

Since each of the wheels of the automobile shown in FIG. 1 has an individual control for its hydraulic suspension device, each of the wheels participates in carrying the automobile load while maintaining the automobile in a generally level plane. The position of the center of gravity of the automobile determines which wheels are in positions relative to the automobile frame below a predetermined desired level at any particular moment during the travel of the automobile. The suspension system as a whole provides an automatic adaptation of the wheel loads in any given situation so as to approximate as closely as possible an ideal distribution of loads or forces, which is characterized by equal sums of load or forces on diagonally opposed wheels.

The individualized control of the suspension devices also facilitates the generation of braking forces individually corresponding to the loads carried or the forces exerted by the various wheels. In order that the suspension system will not respond to short term perturbations, appropriate throttle constrictions are provided in the suspension system so that such short term variations in the level of the automobile are damped out by the diaphragms 21-24 in the chambers 13-16 provided for each of the hydraulic suspension devices 5-8. To keep the spring hysteresis of the suspension devices 5-8 relatively small, low pressure seals and lines for conducting leakage fluid away from the devices may be provided. Typical lines are shown leading from the left-hand ends of cylinders 11 and 12.

Figure 2:
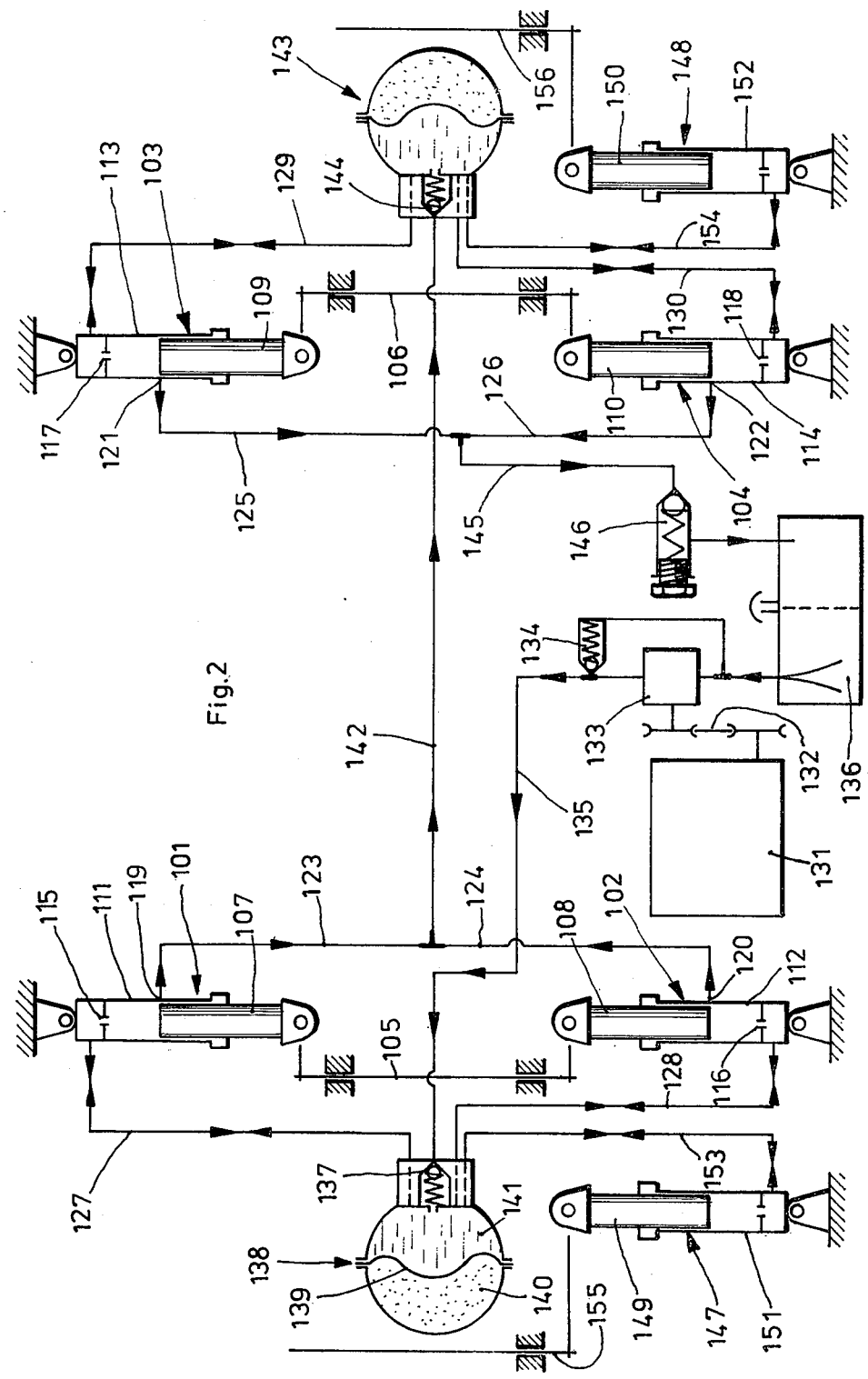
FIG. 2 is a schematic view of a second embodiment of a suspension system according to the invention.

FIG. 2 of the drawings illustrates a second embodiment of the suspension system of the invention used in a vehicle having 8 wheels and 4 axles (not shown). Considering the system of FIG. 2 first with respect to only four of the wheels of the vehicle, the four wheels are coupled to four hydraulic suspension devices 101-104 that are generally similar to and correspond to the devices 5-8 of FIG. 1. (The hydraulic suspension devices 101-104 may also be referred to as spring pressure transmitters.) Suspension devices 101 and 102 are coupled to the wheels of a front axle of the vehicle and are associated with the axle through a stabilizer 105. Similarly, the devices 103 and 104 are coupled to the wheels of a rear axle of the vehicle and are associated with the rear axle through a stabilizer 106.

The suspension devices 101-104 include cylinders 111-114, respectively, which receive pistons 107-110 for reciprocating movement in the cylinders. The ends of the pistons 107-110 that are outside the cylinders 111-114 are coupled to wheels of the vehicle, while the cylinders are mounted on the vehicle frame. Inside the cylinders 111-114 are presssure chambers that vary in size according to the relative positions of the pistons 107-110 in the cylinders. Each pressure chamber is divided into two parts by an annular wall that provides a constricted passage (i.e. 115-118) between the two parts of the chamber. Pressure lines 127-130 communicate with the upper parts of the pressure chambers in the suspension devices 101-104, while control lines 123–126 communicate with the lower parts of the pressure chambers in the suspension devices. As in the suspension system of FIG. 1, the orifices 119–122 through which the control lines 123–126 communicate with the pressure chambers of the suspension devices 101–104 define both predetermined levels above which the pistons 107–110 should remain in the cylinders 111–114 and corresponding desired vertical positions of the respective wheels of the vehicle relative to the vehicle frame.

One difference between the suspension system of FIG. 2 and the suspension system of FIG. 1 is that while in FIG. 1, the suspension devices 5–8 all communicate with the common supply line 35 and the common return line 42 through what may be referred to as a "parallel" arrangement, the suspension devices 101–104 of FIG. 2 communicate with the common supply line 135 and the column return line 145 in what may be referred to as a "series" arrangement. Accordingly, in the embodiment of FIG. 2, hydraulic fluid is delivered from a fluid reservoir 136 to a pump 133 that is driven by the engine 131 for the vehicle through an appropriate tranmission 132. The pump 133 pumps the fluid into a common supply line 135, which conducts the fluid to a hydro-pneumatic pressure reservoir 138. Arranged in parallel with the pump 133 to protect the system against overloading is an excess pressure valve 134. Thus, if an excess volume of fluid is being pumped by the pump 133, the increased pressure in the common supply line 135 will cause the valve 134 to open and return the excess fluid to the inlet of the pump 133.

The hydro-pneumatic fluid pressure reservoir 138, to which the fluid from the common supply line 135 is delivered, consists of a chamber divided into two parts 140 and 141 by a flexible diaphragm or bladder 139. One part 140 of the chamber is filled with compressed gas, while the other part 141 of the chamber, which communicates with the common supply line 135, is filled with fluid under pressure. A check valve 137 prevents return flow of the pressurized fluid from the chamber part 141 to the common supply line 135. From the chamber part 141 in the pressure reservoir 138, pressure lines 127 and 128 lead to fluid suspension devices 101 and 102, respectively. The fluid pressure reservoir 138 maintains the pressure of the fluid in the pressure lines 127 and 128 within a given range.

Control lines 123 and 124 lead away from the suspension devices 101 and 102, respectively, and, as shown in FIG. 2, are joined together to form a single line 142 extending toward the rear of the vehicle and toward a second fluid pressure reservoir 143, similar to reservoir 138. The line 142 thus represents a supply line for the rearward fluid suspension devices 103 and 104. The line 142 communicates with the reservoir 143 through a check valve 144, similar to the check valve 137.

Pressure lines 129 and 130 for the suspension devices 103 and 104, respectively, extend from the pressure reservoir 143 to the pressure chambers in the cylinders 113 and 114. Control lines 125 and 126 for the suspension devices 103 and 104 are joined together to form a common return line 145 for the suspension system, which leads back to the fluid reservoir 136. An adjustable pressure valve 146 is placed in the line 145 before it communicates with the fluid reservoir 136 so as to maintain a selected residual pressure in the common return line 145, just as was done in the common return line 42 illustrated in FIG. 1.

To avoid flow losses in the system of FIG. 2, all pressure lines 127–130 have a relatively large cross-sectional flow area. As in the embodiment of FIG. 1, the residual pressure maintained in the common return line 145 determines the minimum fluid pressure in the pressure chambers of the fluid suspension devices 101–104, neglecting flow losses. The use of fluid pressure reservoirs 138 and 143 instead of individual reservoirs 13–16, as in the embodiment of FIG. 1, causes the spring action of the various wheels of the embodiment of FIG. 2 to be maintained softer than the spring action of the respective axles. The relative softness of the wheel spring action is, of course, kept within appropriate bounds by the stabilizers 105 and 106.

The embodiment of the invention illustrated in FIG. 2 of the drawings permits the fluid pressure generated by the pump 133 to be utilized in two stages, one stage being composed of the fluid suspension devices 101 and 102 and the other stage being composed of fluid suspension devices 103 and 104. As in the embodiment of FIG. 1, the residual pressure maintained in the common return line 145 can be utilized to operate other devices such as power windows. With such additional utilization of the residual pressure in return line 145, the fluid pressure generated by the pump 133 can be said to be used in three stages.

When the engine 131 of the embodiment of FIG. 2 is running, the pump 133 delivers fluid under pressure to the fluid pressure reservoir 138 and to the pressure chambers of the fluid suspension devices 101–102. Accordingly, the fluid pressure pushes the pistons 107 and 108 downwardly in the cylinders 111 and 112, respectively, until one of the orifices 119 and 120 through which the control lines 123 and 124 communicate with the pressure chambers of the devices 101 and 102 is exposed. When one of the orifices 119 and 120 is exposed, the level of the front axle of the vehicle is fixed. If the center of gravity of the vehicle is to the right, or to the top of the page as viewed in FIG. 2, for example, the orifice exposed will be orifice 120.

A corresponding leveling procedure will occur for the rearward axle of the vehicle through the fluid suspension devides 103 and 104. Again, assuming that the center of gravity of the vehicle is on its right-hand side, or at the upper half of FIG. 2, and the pistons 109 and 110 are extended under the pressure of the fluid being supplied through the pressure lines 129–130, the orifice 122, through which the control line 126 communicates with the pressure chamber in the suspension device 104 on the left-hand side of the vehicle, will be exposed before the orifice 121 so that the vehicle assumes a slight transverse inclination. The two suspension devices 101 and 103 on the right-hand side of the vehicle will resiliently support the vehicle in accordance with the position of the center of gravity of the vehicle, the conditions of the roadway, the spring characteristics of the associated stabilizers 105 and 106 and the loading of the vehicle.

As previously indicated, the embodiment of FIG. 2 illustrates a suspension system for a vehicle having four axles. In particular, FIG. 2 illustrates two suspension devices 147 and 148 for one wheel on each of the two axles of the vehicle that have not discussed previously. Stabilizers 155 and 156, similar to stabilizers 105 and 106, couple the suspension devices 147 and 148 to the respective axles (not shown). The suspension devices 147 and 148 include cylinders 151 and 152 that are coupled to the vehicle frame and receive reciprocating pistons 149 and 150, similar to the pistons 107–110 of FIG. 2. The suspension devices 147 and 148 are provided with pressure lines 153 and 154 but no control lines.

The pressure lines 153 and 154 communicate with the fluid pressure reservoirs 138 and 143, respectively. Accordingly, the suspension devices 147 and 148 are associated with one of the two groups or stages or suspension devices represented by the devices 101 and 102 and by the devices 103 and 104. Thus, even though the vehicle of FIG. 2 has four axles, the first two of suspension devices 101–104, in a given situation, having pistons that drop below the respective control line orifices 119–122 will fix a "level line" for the entire vehicle. The relative positions of the pistons in the remaining suspension devices 101–104 is then determined according to the center of gravity of the vehicle, the road conditions, and the stabilizer spring characteristics, as noted above. The wheels associated with the other two axles and the suspension devices 147 and 148 do not participate in the determination of the "level line". These wheels, instead, stand at an arbitrary height depending upon the pressure maintained in the fluid pressure reservoirs 138 and 143.

The suspension system illustrated schematically in FIG. 2 would operate essentially the same for a vehicle having only three axles. The wheels associated with two of the suspension devices 101–104 would determine the "level line" for the vehicle, while opposed wheels would be slightly retracted and the wheels for th remaining axles, such as the wheel associated with the suspension device 148, would stand at arbitrary heights.

In order to keep the spring hysteresis small, the suspension devices 101–104 may be equipped with low pressure seals and necessary lines (not shown) for taking leakage fluid away from the seals. In addition, the suspension systems illustrates in FIGS. 1 and 2 may be designed as purely pneumatic systems having open, half-open, or closed circuits. The hydro-pneumatic design illustrated in the drawings has, however, the advantage of a smaller outlay. It is also possible to attach the pistons of the suspension devices to the vehicle frame or body and the cylinders to the wheels.

Different maximum pressures can be obtained in the various fluid suspension devices by varying the construction of the check valves, such as valves 38–41, associated with the suspension devices. Likewise, the fluid suspension devices can have different minimum pressures if their respective pistons are different sizes, for example.

The suspension system of the invention can be used in a tractor-trailer vehicle by providing both the tractor and the trailer with similar system arrangements. The suspension system for the trailer can then be coupled to the pressure system for the tractor.

It will be understood that the embodiments described above are merely exemplary and that persons skilled in the art may make variations and modifications without departing from the spirit and scope of the invention. All such modifications and variations are intended to be within the scope of the invention as defined in the appended claims.

I claim:
1. A suspension system for a vehicle having a frame, a plurality of wheels and at least two axles mounting the wheels comprising:
   a. means defining a source of fluid under pressure;
   b. a plurality of fluid suspension means, each coupled to the vehicle frame and to a wheel of the vehicle, different fluid suspension means being coupled to different wheels, each fluid suspension means including:
      i. a cylinder, and
      ii. a piston mounted for reciprocating movement in the cylinder, the cylinder and a face of the piston defining a pressure chamber in the cylinder;
   c. a supply line coupled to the source of fluid for conducting fluid under pressure from the source of fluid toward the fluid suspension means;
   d. a return line coupled to the source of fluid for conducting fluid away from the fluid suspension means to the source of fluid;
   e. means for maintianing a residual fluid pressure in the return line; and
   f. a system of conduits coupled to the fluid suspension means, the supply line and the return line so as to define an integrated system of fluid flow path, the conduit system including:
      i. a pressure line for each fluid suspension means, each pressure line communicating with the supply line and with the pressure chamber of a fluid suspension means and thereby being adapted to deliver fluid under pressure from the supply line to said pressure chamber, and
      ii. a control line for each of at least one of the fluid suspension means, each control line communicating with the return line and with the pressure chamber of a fluid suspension means and thereby being adapted to conduct fluid away from said fluid suspension means toward the return line, the control line maintaining constant communication with the pressure chamber of said fluid suspension means only when the piston of said fluid suspension means is in a position relative to the cylinder of said fluid suspension means corresponding to a vertical position of an associated wheel of the vehicle relative to the frame of the vehicle lower than a predetermined level, said communication between the pressure chamber of said fluid suspension means and the control line being interrupted by the piston of said fluid suspension means when said piston of said fluid suspension means is in a position relative to the cylinder of said fluid suspension means corresponding to a vertical position of said associated wheel relative to the frame of the vehicle which is higher than said predetermined level, the residual fluid pressure being maintained in the return line being equal to a predetermined minimum fluid pressure in the pressure chamber of said at least one fluid suspension means, neglecting flow losses.

2. A suspension system according to claim 1, further comprising a control valve for each of said at least one fluid suspension means, the pressure line and the control line for each of said at least one flud suspension means communicating with the supply line and the return line, respectively, through an associated control valve, each control valve being constructed so that
   a. when the piston of said at least one fluid suspension means is in a position such that communication between the control line for said at least one fluid suspension means and the pressure chamber of said at least one fluid suspension means is interrupted, the pressure line for said at least one fluid suspension means communicates with the supply line through the control valve and communication between the control line for said at least one fluid suspension means and the return line is interrupted, and b. when the piston of said at least one fluid suspension means is in a position such that the control line for said at least one fluid suspension means communicates with the pressure chamber of said at least one fluid suspension means, the pressure of fluid in said control line causes the control valve to interrupt communication between the pressure line for said at least one fluid suspension means and the supply line and to open communication between said control line and the return line.

3. A suspension system according to claim 2, wherein each control valve includes:

a. a housing, the control line and the pressure line for the fluid suspension means associated with the control valve and the supply and return lines all communicating with the interior of the housing;

b. a slide member located within the housing for reciprocal movement, the slide member having
  i. a passage extending longitudinally of slide member and communicating with both ends of the slide member,
  ii. a first recess adjacent to and communicating with one end of the slide member and communicating with the control line at a point at which the control line communicates with the interior of the housing of the control valve, the return line communicating with the interior of the valve housing adjacent the other end of the slide member, and
  iii. a second recess spaced lengthwise of the slide member from the first recess and adapted to be aligned with a point at which the pressure line communicates with the interior of the housing of the control valve; and c. spring means biasing the slide member into a first position in which the one end of the slide member contacts a corresponding end of the housing and closes a corresponding end of the longitudinal passage of the slide member, thereby interrupting communication between the control line and the return line, and in which the second recess is aligned with the point at which the pressure line communicates with the interior of the housing for the control valve so that the pressure line communicates with the supply line through the second recess,
  the pressure of fluid in the control line acting on a surface of the second recess so as to oppose the biasing action of the spring, thereby tending to bias the slide member into a second position in which the one of the slide member is spaced from the corresponding end of the housing so as to open communication between the control line and the return line through the second recess and the longitudinal passage and in which communication between the pressure line and the supply line is interrupted.

4. A suspension system according to claim 2, wherein the pressure maintaining means includes a valve coupled to the return line adjacent the source of fluid under pressure, said valve opening to permit a flow of fluid toward the source of fluid under pressure only when the pressure of the fluid in the return line exceeds the predetermined minimum fluid pressure.

5. A suspension system according to claim 1, wherein the means defining the source of fluid under pressure includes a pump for pumping fluid, a pressure regulating valve through which the supply line communicates with the pump, and conduit means extending between the pump and the pressure regulating valve, the pressure regulating valve including:

a) a housing defining a valve seat, the conduit means and the supply line communicating with the interior of the housing;

b) a valve body mounted for reciprocating movement in the housing and adapted to be seated in the valve seat of the housing, and c) spring means biasing the valve body toward the valve seat,
  the valve body and the housing being configured so that when the valve body is seated in the valve seat, a first surface of the valve body is exposed to the pressure of fluid in the supply line and the supply line communicates with the conduit means and the pump,
  the pressure of the fluid in the supply line opposing the biasing action of the spring and tending to bias the valve body away from the valve seat and into a position in which communication between the supply line and the pump is interrupted, a second surface of the valve body being exposed to the pressure of the fluid in the supply line in addition to the first surface when the valve body is in said position,
  the ratio of the area of the first surface to the combined areas of the first and second surfaces defining the ratio of maximum pressure in the supply line to minimum pressure in the supply line.

6. A suspension system according to claim 1, wherein a check valve is included in each pressure line.

7. A suspension system according to claim 1, wherein the vehicle has at least four wheels that are coupled to fluid suspension means and wherein a control line is provided for each of at least four fluid suspension means, at least two of the wheels coupled to said at least four fluid suspension means being located on each side of the vehicle, said at least two wheels on each side of the vehicle being spaced longitudinally of the vehicle from each other.

8. A suspension system according to claim 1, wherein on one side of the vehicle, only two wheels spaced longitudinally of the vehicle from each other are coupled to fluid suspension means that are coupled to both pressure lines and control lines, the pressure line associated with the one of said only two wheels which is located forward of the other wheel being coupled to the supply line, while the pressure line associated with the other of said only two wheels is coupled to the control line associated with the one of said only two wheels, and wherein of the control lines associated with said only two wheels, only the control line associated the other of said only two wheels is coupled to the return line.

9. A suspension according to claim 8, wherein on each side of the vehicle, only two wheels spaced longitudinally of the vehicle from each other are coupled to fluid suspension means that are coupled to both pressure lines and control lines, the pressure line associated with the more forward wheel of said only two wheels on each side of the vehicle being coupled to the supply line, while the pressure line associated with the more rearward wheel of said only two wheels on each side of the vehicle is coupled to the control line associated with the more forward wheel, the control lines associated with the more forward wheels being coupled together.

10. A suspension system according to claim 8, wherein on said one side of the vehicle, at least one wheel other than said only two wheels is coupled to a fluid suspension means having a pressure chamber that communicates with a pressure line coupled to the supply line.

11. A suspension system according to claim 8, wherein on said one side of the vehicle, at least one wheel other than said only two wheels is coupled to a fluid suspension means having a pressure chamber that communicates with a pressure line coupled to the control line for the one of said only two wheels.

12. A suspension system according to claim 8, further comprising a check valve interposed between the pressure line associated with the other of said only two wheels and the control line associated with the one of said only two wheels.

13. A suspension system according to claim 11, further comprising a check valve interposed between the pressure line associated with the other of said only two wheels and between the pressure line associated with said at least one wheel other than said only two wheels and the control line associated with the one of said only two wheels.

14. A suspension system according to claim 8, further comprising a check valve interposed between the supply line and the pressure line associated with the one of said only two wheels.

15. A suspension system according to claim 10, further comprising a check valve interposed between the supply line and the pressure line associated with the one of said only two wheels and between the supply line and the pressure line associated with said at least one wheel other than said only two wheels.

16. A suspension system according to claim 8, further comprising means defining two reservoirs for fluid adapted to maintain fluid in the reservoirs under pressure, one of said fluid reservoirs being interposed between the supply line and the pressure line associated with the one of said only two wheels, the other of said fluid reservoirs being interposed between the pressure line associated with the other of said only two wheels and the control line associated with the one of said only two wheels.

17. A suspension system according to claim 16, wherein the reservoir defining means includes two hydropneumatic members, each member comprising a chamber and a flexible diaphragm dividing the chamber into two separate parts, one part of the chamber containing a gas under pressure and the other part of the chamber containing the fluid under pressure, the pressure lines communicating with the other parts of the chambers of the two hydro-pneumatic members.

18. A suspension system according to claim 16, further comprising a first check valve interposed between the supply line and the pressure line associated with the one of said only two wheels and a second check valve interposed between the pressure line associated with the other of said only two wheels and the control line associated with the one of said only two wheels, the first check valve being located upstream from the one reservoir in the direction of fluid flow and the second check valve being located upstream from the other reservoir in the direction of fluid flow.

19. A suspension system according to claim 9, further comprising means defining two reservoirs for fluid adapted to maintain fluid in the reservoirs under pressure, one of said fluid reservoirs being interposed between the supply line and the pressure line associated with the more forward wheel of said only two wheels on each side of the vehicle, the other of said fluid reservoirs being interposed between the pressure line associated with the more rearward wheel of said only two wheels on each side of the vehicle and the control line associated with the more forward wheel of said only two wheels on each side of the vehicle.

20. A suspension system according to claim 19, wherein the reservoir defining means includes two hydropneumatic members, each member comprising a chamber and a flexible diaphragm dividing the chamber into two separate parts, one part of the chamber containing a gas under pressure and the other part of the chamber containing the fluid under pressure, the pressure lines communicating with the other parts of the chambers of the two hydro-pneumatic members.

21. A suspension system according to claim 19, further comprising a first check valve interposed between the supply line and the pressure line associated with the more forward wheel of said only two wheels on each side of the vehicle, and a second check valve interposed between the pressure line associated with the more rearward wheel of said only two wheels on each side of the vehicle and the control line associated with the more forward wheel of said only two wheels on each side of the vehicle, the first check valve being located upstream from the one reservoir in the direction of fluid flow and the second check valve being located upstream from the other reservoir in the direction of fluid flow.

* * * * *

UNITED STATES PATENT AND TRADEMARK OFFICE
CERTIFICATE OF CORRECTION

PATENT NO. : 4,030,777
DATED : June 21, 1977
INVENTOR(S) : Karl Rabenseifner

It is certified that error appears in the above-identified patent and that said Letters Patent are hereby corrected as shown below:

```
Column 2, line 2, "portion" should read --portions--;
Column 3, line 6, "movment" should read --movement--;
Column 3, line 58, insert a comma (,) after "time";
Column 5, line 18, "of the valve" should read --in the valve--;
Column 5, line 61, "result" should read --return--;
Column 5, line 62, "systems" should read --system--;
Column 5, line 66, "espectially" should read --especially--;
Column 5, line 67, "side" should read --sides--;
Column 6, line 4, "basis" should read --basic--;
Column 6, line 9, "it" should read --in--;
Column 6, line 23, "vehicles" should read --vehicle--;
Column 7, line 12, "in" should read --to--;
Column 7, line 39, "chamber" should read --chambers--;
Column 8, line 32, "lines 42" should read --line 42--;
Column 8, line 47, "of diaphragm" should read --or diaphragm--;
Column 9, line 9, "in he valve" should read --in the valve--;
Column 10, line 15, "generaly" should read --generally--;
Column 10, line 21, "as FIG. 1," should read --in FIG. 1,--;
Column 10, line 25, "te slide" should read --the slide--;
Column 11, line 22, "line 35" should read --line 25--;
Column 11, line 23, "communicator" should read --communication--
```

UNITED STATES PATENT AND TRADEMARK OFFICE
CERTIFICATE OF CORRECTION

PATENT NO. : 4,030,777
DATED : June 21, 1977
INVENTOR(S) : Karl Rabenseifner

It is certified that error appears in the above-identified patent and that said Letters Patent are hereby corrected as shown below:

```
Column 11, line 46, "hydrualic" should read --hydraulic--;
Column 11, line 48, "cyliner" should read --cylinder--;
Column 11, line 53, "presssure" should read --pressure--;
Column 12, line 24, "load" should read --loads--;
Column 13, line 14, "line 35" should read --line 33--;
Column 13, lines 22-23, "tranmission" should read --transmission
Column 14, line 43, "devides" should read --devices--;
Column 14, line 63, after "not" insert --been--;
Column 15, lines 8-9, "or suspension" should read
--of suspension--;
Column 15, line 30, "for th" should read --for the--;
Column 15, line 59, after "make" insert --many--;
Column 16, line 16, "maintianing" should read --maintaining--;
Column 16, line 20, "path," should read --paths,--;
Column 16, line 59, "flud" should read --fluid--; and
Column 17, line 57, after "one" insert --end--.
```

Signed and Sealed this

First Day of November 1977

[SEAL]

Attest:

RUTH C. MASON
Attesting Officer

LUTRELLE F. PARKER
Acting Commissioner of Patents and Trademarks